Jan. 5, 1937. O. H. DICKE 2,066,965
VERNIER MOTOR
Original Filed May 23, 1929
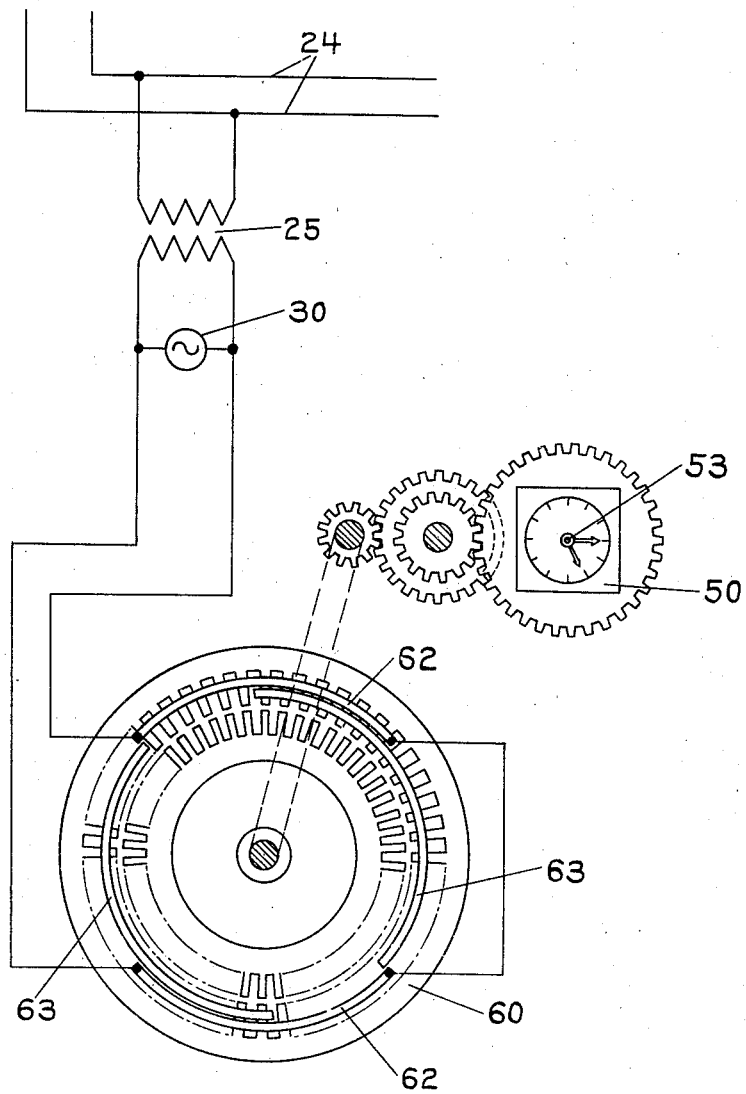
INVENTOR
O. H. Dicke Patented Jan. 5, 1937

2,066,965

UNITED STATES PATENT OFFICE 2,066,965

VERNIER MOTOR

Oscar L. Dicke, Rochester, N. Y.

Original application May 23, 1929, Serial No. 365,584. Divided and this application March 7, 1934, Serial No. 714,379

18 Claims. (Cl. 172—275)

This application is a division of my application Ser. No. 365,584 filed May 23, 1929, which is a continuation of my prior application Ser. No. 158,370 filed December 31, 1926.

This invention relates to means for transmitting information over power circuits, and more particularly to the transmission of time signals over an electric light and power distribution system.

Some of the objects of the present invention reside in the provision of means whereby the number of cycles per hour of power current generated may be kept constant and by the provision of synchronous motor clock means for indicating time at the power consumer.

Other objects, purposes and characteristics of the present invention will in part be obvious from the accompanying drawing and in part appear from the following detailed description.

In describing the invention in detail reference will be made to the accompanying drawing in which has been illustrated one form of the invention.

In accordance with the form of the present invention it is proposed to indicate the time of day, at the various consumer residents, offices or factories, by driving clock hands by a synchronous motor of the usual or special construction, these clock hands only indicating the proper time if the power house equipment generates the requisite number of cycles per hour, and for this reason the power house is furnished with a synchronous motor driven clock and a standard clock indicating United States Observatory time, and the power house attendant is required to keep his frequency such that the synchronous clock indicates the same time as the standard clock.

To one of the lighting feeders, namely feeder 24, are connected a plurality of lighting transformers which reduce the voltage from the distribution potential, of say 2200 volts, to a voltage suitable for consumer's use, say 110 volts. Of these transformers the transformer 25 only has been shown. To illustrate a lighting load for which this distributing net work is primarily used the lamp 30 has been shown. The distribution load may include some motor load which has for convenience not been shown.

The clock hands of the clock 50 are driven by a synchronous motor of any suitable construction but is preferably driven by a novel synchronous motor 60 having an extremely low synchronous speed. The operation of this novel motor is based on the principle that if the number of teeth of the rotor is different than the number of teeth in the stator only certain of these teeth can be in alignment, and that a rotating magnetic field will cause the alignment of the teeth to rotate with the magnetic field. In this particular arrangement shown, there are 48 teeth on the stator and 50 on the rotor so that the rotor will rotate through an angle of 2 teeth for each cycle assuming a two-pole distributed coil type stator winding 62, and if a sixty cycle power current is used the motor will have a synchronous speed of 144 revolutions per minute. Any desired synchronous speed can of course be obtained by selecting the number of rotor and stator teeth per magnetic pole and the number of magnetic poles. The stator winding is preferably a distributed winding and may be two phase, of which one phase is connected directly to the line and the other phase derives its current from a phase shifter such as shown in the Lucas patent hereinafter referred to, or the winding may be connected split phase or it may be a single phase winding 62 having short circuited shading rings or coils 63 associated therewith, so as to obtain a two-pole rotating magnetic field. In any event, the preferred type of motor has a large number of teeth per pole and has a difference of one between the rotor and stator teeth per pole, and is constructed to operate on single phase current. The hour shaft 53 which rotates one revolution per hour, and in turn the 12 hour hand, which rotates one revolution in twelve hours, is driven by the motor through any suitable type of gear train, such as shown, assuming of course that the proper gear ratio is selected, the small or 12 hour hand being driven by the hour shaft by suitable gearing.

The phase shifter above mentioned comprises a static transformer of peculiar construction and is fully described in the patent to Lucas No. 1,566,333 dated December 22, 1925; and consists of a core of laminated transformer iron, preferably of the general shape shown in said patent, which contains a primary winding, a secondary winding and two bucking or shading coils. This phase shifter is so constructed that the voltage induced in secondary winding is displaced substantially 90 electrical degrees with respect to the voltage impressed upon the primary winding.

Having thus shown and described only one embodiment of my invention, and having shown it rather specifically although certain elements thereof have been illustrated conventionally, it is desired to be understood that this has been done to exemplify the invention in a convenient manner; and it is desired to be understood that the invention is not limited to the particular arrangement shown either specifically or conventionally, and that various changes and modifications may be made to adapt the invention to any particular light and power distributing or similar system without departing from the scope of the invention or the idea of means underlying the same.

What I desire to secure by Letters Patent is:—

1. In a synchronous alternating current motor, the combination with an annular stator, a shaft in said stator, coils in said stator energized by alternating currents to produce fluxes displaced in phase to cause a rotating magnetic field, and means coordinating said rotating magnetic field with said shaft to cause a minimum reluctance between said shaft and stator to rotate synchronously with the rotating magnetic field of said stator but to cause said shaft to rotate at a lower speed than the speed of said rotating magnetic field.

2. In a synchronous alternating current motor, the combination with an annular stator, a shaft in said stator, coils on said stator energized by alternating currents to produce fluxes displaced in phase to cause a rotating magnetic field, and means for producing uni-directional starting torque due to vernier alignment between magnetic teeth in said rotor and magnetic teeth supported by said shaft to cause said shaft to rotate at a definite invariable fraction of the speed of rotation of said magnetic field.

3. In a synchronous alternating current clock motor, the combination with an annular stator, a shaft in the axis of said stator, coils on said stator energized by alternating currents to produce fluxes displaced in phase to cause a rotating magnetic field, a toothed magnetic rotor on said shaft, and means including relatively movable differently spaced iron teeth on said stator and said rotor coordinating said rotating magnetic field with said rotor and stator to cause the rotor and stator teeth to line up with said magnetic field so that this alignment will rotate with said magnetic field to cause said shaft to rotate sub-synchronously with respect to said magnetic field.

4. In a synchronous alternating current clock motor, the combination with an annular stator, a shaft in said stator, coils on said stator energized by alternating currents to produce fluxes displaced in phase to cause a rotating magnetic field, an even number of teeth on said stator and a different even number of teeth on a rotor on said shaft whereby the teeth on the rotor and the teeth on the stator will be aligned in synchronism with the rotation of said magnetic field resulting in rotation of said shaft at a fraction of the speed of rotation of said magnetic field equal to the difference between the number of rotor and stator teeth divided by the number of teeth on said rotor.

5. A vernier motor comprising magnetizable toothed stator and rotor members, and means for producing a rotating magnetic field therein, characterized by the tooth pitches of the stator and rotor members being different, and corresponding to total tooth numbers $T_s$ and $T_r$ for the stator and rotor, such that $360°/T_s$ and $360°/T_r$ are the stator and rotor tooth-pitches, in degrees, and $T_s - T_r = \pm np$, exactly, where $p$ is the number of poles of the rotating field, and $n$ is any small integer except zero, the actual numbers of stator and rotor teeth being both at least several times said difference $\pm(T_s - T_r)$.

6. The invention as set forth in claim 5, characterized by the spaces between any successive teeth being larger than a single air-gap between the rotor and stator members.

7. The invention as set forth in claim 5, characterized by the fact that the teeth of at least one of said members are all uniformly spaced and extend around the entire periphery.

8. A vernier motor comprising toothed stator and rotor members, each member having uniformly spaced magnetizable teeth extending around the entire periphery, and means for producing a rotating magnetic field, threading through coinciding stator and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm np$, where $p$ is the number of poles of the rotating field, and $n$ is any small integer except zero, the numbers of stator and rotor teeth being both at least several times said difference.

9. The invention as set forth in claim 8, characterized by the spaces between successive teeth being larger than a single air-gap between the rotor and stator members.

10. A vernier motor comprising toothed stator and rotor members, each member having uniformly spaced magnetizable teeth extending around the entire periphery, and means for producing a rotating magnetic field, threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

11. The invention as set forth in claim 10, characterized by the spaces between successive teeth being larger than a single air-gap between the rotor and stator members.

12. A vernier motor comprising toothed stator and rotor members, each member having uniformly spaced magnetizable teeth extending around the entire periphery, and a winding on the stator member for producing a rotating magnetic field, when energized from a commercial frequency power circuit, said rotating magnetic field threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to $\pm p$, where $p$ is the number of poles of the rotating field, the numbers of stator and rotor teeth being both at least several times said difference.

13. A self-starting vernier motor comprising toothed stator and rotor members, each member having uniformly spaced magnetizable teeth extending around the entire periphery, and a winding on the stator member for producing a rotating magnetic field, when energized from a ommercial-frequency power circuit, said rotating magnetic field threading through coinciding stator- and rotor-member teeth, from one member to the other, and back again through other coinciding teeth, the coincidence of the flux-carrying teeth progressing slowly around the periphery, by vernier action, as the field rotates, characterized by the difference between the numbers of the stator teeth and the rotor teeth being exactly equal to ±$p$, where $p$ is the number of poles of the rotating field, the numbers of stator and rotor teeth being both at least several times said difference, the spaces between successive teeth being larger than a single air-gap between the rotor and stator members.

14. A slow-speed synchronous motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the rotor member having two teeth more than the stator member.

15. A slow-speed synchronous clock motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the difference between the numbers of stator and rotor teeth being two.

16. A slow-speed synchronous clock motor operating on a commercial-frequency single-phase supply, comprising a magnetizable stator core having a large number of teeth uniformly distributed about its air-gap periphery, a magnetizable rotor core having a large number of teeth uniformly distributed about its air-gap periphery, and means for producing a two-pole magnetic field rotating in said stator member at full two-pole synchronous speed, the difference if the total teeth of one core be subtracted from the total teeth of the other core being two.

17. In combination; two members comprising a stator of magnetic material and a rotor of magnetic material said stator and rotor being relatively rotatable and so associated with each other as to leave an air gap conforming to the surface of a cylinder, teeth on each of said members adjacent said air gap, a multipolar winding on one of said members which if energized by single phase alternating current will produce a rotating magnetic field of a north pole followed by a south pole in said air-gap and about said inner member, the number of teeth in one of said members being at least three for each pole of said winding, and the number of teeth per pole and their spacing of the other member being such that if one member is turned with respect to the other there is produced a rotating minimum reluctance path through the rotor, air gap and stator, which path will rotate at a speed equal to the number of teeth per pole in said one member multiplied by the rate of turning, whereby if said winding is energized by single phase alternating current the rotating magnetic field resulting therefrom will lock into said minimum reluctance path to cause said members to rotate relatively at a rate equal to two times the number of cycles of the alternating current divided by the total number of teeth in said other member.

18. A motor comprising in combination, a stator including annularly arranged teeth of magnetic material, a rotor of magnetic material mounted for rotation in said stator and having outwardly projecting teeth, current carrying means associated with said stator for producing from single phase alternating current an inwardly projecting rotating magnetic field of a north pole followed by a south pole in said stator and projecting into said rotor, the number of teeth in said rotor being at least three per pole of said magnetic field, and the number of teeth per pole of said stator being such that if said rotor is turned in said stator the tooth coincidence will result in a rotating minimum reluctance path through the air gap and connecting said rotor and stator and rotating at a speed equal to the number of teeth per pole in said rotor multiplied by the rate of turning, whereby if said current-carrying means is energized by single phase alternating current the resulting magnetic field will lock into said minimum reluctance path and cause said rotor to turn at a speed equal to two times the number of cycles of alternating current divided by the total number of teeth in said rotor.

OSCAR H. DICKE.